United States Patent

[11] 3,580,168

[72] Inventor Karl Zysset
Hauptstrasse 31, 3250 Lyss, Switzerland
[21] Appl. No. 851,185
[22] Filed Aug. 19, 1969
[45] Patented May 25, 1971
[32] Priority Aug. 28, 1968
[33] Switzerland
[31] 12868/68

[54] HAND SQUEEZER FOR FRUITS AND VEGETABLES
5 Claims, 4 Drawing Figs.

[52] U.S. Cl. .................................................. 100/234, 146/3
[51] Int. Cl. .................................................. B30b 7/00
[50] Field of Search .................................................. 100/110, 116, 233, 234, 235, 243; 146/3.9

[56] References Cited
UNITED STATES PATENTS
2,776,616 1/1957 Sarossy .................. 100/234
FOREIGN PATENTS
181,934 10/1954 Austria .................. 100/234
1,093,394 11/1954 France .................. 100/234
486,487 6/1938 Great Britain .................. 100/234
427,679 11/1947 Italy .................. 100/234
436,601 11/1967 Switzerland .................. 100/234

Primary Examiner—Billy J. Wilhite
Attorney—Howson and Howson

ABSTRACT: Squeezer has two levers pivotally connected together nearer one end than the other so as to divide the levers into two arms each of unequal length, of which the longer arms constitute the handle and the shorter arms respectively the receptacle for the fruit or vegetable and a plunger, and either the bottom of the receptacle or of the plunger is provided with holes through which the juice escapes.

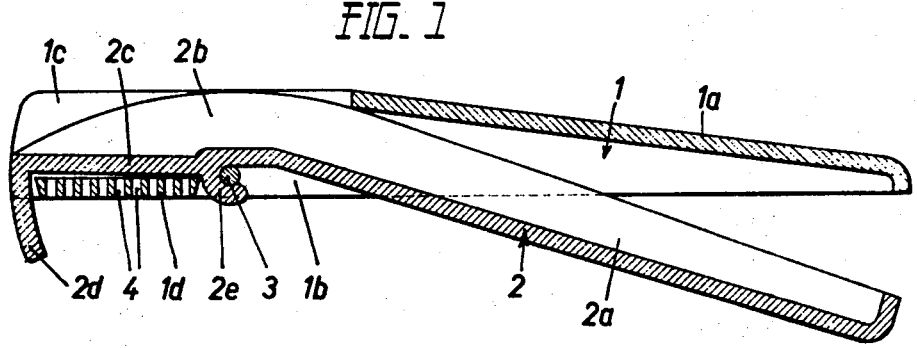
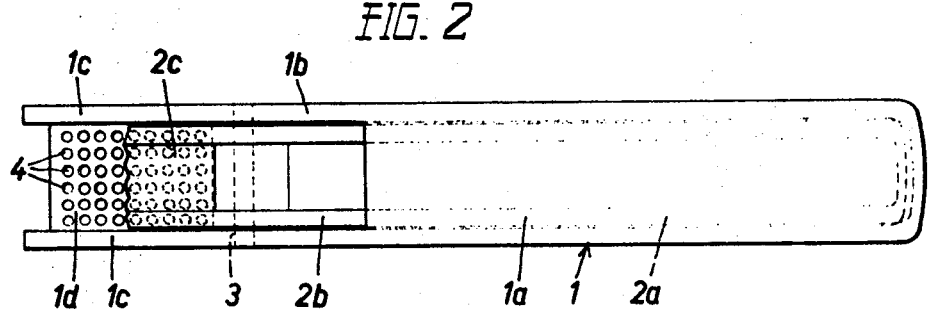
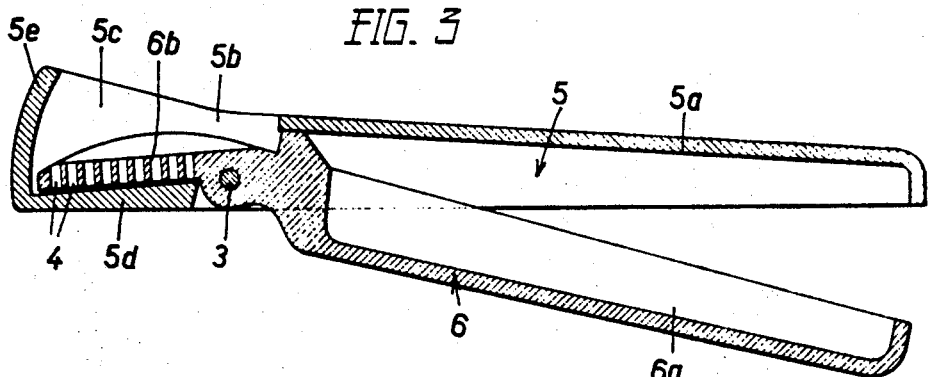
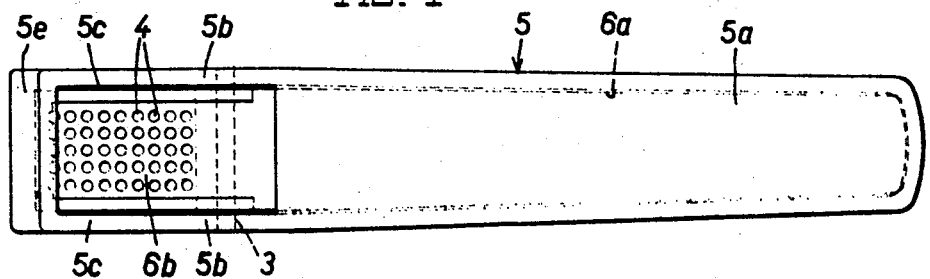

HAND SQUEEZER FOR FRUITS AND VEGETABLES

BACKGROUND OF THE INVENTION

The invention relates to a hand squeezer for fruits and vegetables, and includes two levers pivotally connected together, a handle, U-shape in cross section, formed by the major length of each lever, a receptacle, U-shape in cross section, for holding fruit and vegetables, incorporated by one of the two levers in a part thereof extending from its handle, a bottom for the receptacle, a one-piece plunger incorporated by the other one of the two levers for entering the receptacle when the levers are closed together, a bottom incorporated by the plunger, and a plurality of juice escape openings in one of the two bottoms.

In a squeezer of this kind, described, for example, in the Swiss Pat. No. 436,601 of the present inventor, the two levers have each only a single arm, and are pivotally connected together at their ends neighboring the receptacle and the plunger. Both the receptacle and the plunger are troughlike, so that irrespective of whether the juice escape openings are in the bottom of the one or the other they are difficult to clean. It should be borne in mind that the frequently stringy pulp tends to clog in these openings.

SUMMARY OF THE INVENTION

The purpose of the invention to provide a hand squeezer that avoids this disadvantage by making each lever two-armed, and providing the part with the openings with a flat free end, and the free end of the opposed part with a wall curved about the pivot axis of the squeezer, and up and down which wall the flat free end moves when the levers are opened and closed.

In one embodiment in order to make cleaning still easier, both the part having the openings and the opposed part are flat, and/or the ends of the pivot pin are fixed in the sidewalls of that lever comprising the receptacle in its shorter arm, whereas the other arm embodies as a bearing for the pin a hook of which the opening faces away from the curved wall, enabling the two levers to be taken apart at will.

BRIEF DESCRIPTION OF THE DRAWING

The invention will be described, with reference to the FIGS. of the accompanying drawing, wherein:

FIG. 1 is a longitudinal section of a first embodiment;
FIG. 2 is the corresponding top view of FIG. 1;
FIG. 3 is a longitudinal section of a second embodiment; and
FIG. 4 is the top view corresponding to FIG. 3.

DESCRIPTION OF THE PREFERRED EMBODIMENTS

With reference to FIGS. 1 and 2, the hand squeezer for fruits and vegetables essentially consists of two levers 1 and 2 and the pivot pin 3. Each lever has two arms, the longer arm 1a or 2a being U-shaped in cross section and serving as the handle. The respective sidewalls 1b and 2b of these levers are mutually parallel in the longitudinal direction and extend beyond the position of the lever pivot to the end of the shorter arms of the two levers. The ends of the pin 3 are fixed in the sidewalls 1b of the lever 1. These same sidewalls form along the length of the shorter lever arm the sidewalls 1c of a receptacle for the fruit or vegetable, the bottom 1d of the receptacle being formed by a web incorporated by the shorter lever arm. The bottom 1d embodies escape openings 4 for the juice, and is flat throughout its entire length, including its free end, which has no transverse projection. The flat web 2c incorporated by the shorter arm of the lever 2 acts as the plunger bottom of the squeezer, and is provided at its free end with a wall 2d that is curved through an arc about the pivot axis of the squeezer. This wall forms the front end of the receptacle, and the front end of the bottom 1d moves up and down this wall when the levers 1 and 2 are moved.

In this embodiment, the lever 2 has a hook 2e that serves as the bearing for the pin 3. The opening of the hook faces away from the wall 2d, enabling the two levers 1 and 2 to be taken apart at will.

In the embodiment shown in FIGS. 3 and 4, the two-arm levers 5 and 6 once again have each a respective longer arm 5a or 6a, which together are the handles, which are U-shaped in cross section. In the neighborhood of the lever pivot and of the shorter lever arms, the sidewalls 5b of the lever 5 are mutually parallel in the longitudinal direction. As in the previous embodiment, the ends of the pivot pin 3 are fixed in these sidewalls, which again form the sidewalls 5c of the receptacle whose bottom 5d consists of the web embodied by the shorter arm of the lever 5. The bottom 5d is solid, and is provided at its free end with a front wall 5e that is curved about the pivot axis of the squeezer and joined to the sidewalls 5c. The lever 6 is solid in the neighborhood of the lever pivot and provided with a bore through which the pin 3 passes. The shorter arm of the lever 6 forms the plunger of the squeezer. The plunger bottom 6b consists of a web that is flat throughout its length, comprises escape openings 4 for the juice, and has a tapered, flat free end that is absent any transverse projection. This free end moves up and down the inner face of receptacle end wall 5e, when the levers are opened and closed.

In accordance with the invention, the two embodiments described can be modified in a great many ways. By way of example, in the neighborhood of the pivot pin 3 the lever 2 can be constructed as is the lever 6 or, conversely, in this same neighborhood, the lever 6 constructed as the lever 2 is.

Although the preferred embodiments of the invention have been described, the scope of, and the breadth of protection afforded to, the invention are limited solely by the appended claims.

What I claim is:

1. A hand squeezer for fruits and vegetables, including two levers, means for pivotally connecting said levers together, a handle, U-shaped in cross section, formed by the major length of each said lever, a receptacle, U-shaped in cross section, for holding fruits and vegetables, incorporated by one of said two levers in a part thereof extending from its said handle, a bottom for said receptacle, a one-piece plunger incorporated by the other one of said two levers for entering said receptacle when said levers are closed together, a bottom incorporated by said plunger, and a plurality of juice escape openings in one of said two bottoms, and wherein the improvement comprises that each of said two levers has two arms, a respective free end embodied by each said bottom, a wall curved through an arc about the pivot axis of the squeezer incorporated by said free end of that bottom which is solid, and a flat said free end for that bottom which has said holes, said flat free end moving up and down said curved wall when said levers are opened and closed.

2. The squeezer as defined in claim 1, wherein both said bottoms are flat.

3. The squeezer as defined in claim 2, wherein said receptacle bottom has said flat free end and said plunger bottom has said curved wall.

4. The squeezer as defined in claim 1, wherein said plunger bottom has said flat free end and said receptacle bottom has said curved wall.

5. The squeezer as defined in claim 1, wherein said means for pivotally connecting together said two levers is a pin, one said arm of each said lever is longer than the other, and the shorter arm of one of said levers incorporates said receptacle, and further including sidewalls embodied by the lever having said receptacle and in which said sidewalls is fixed said pin, and a hook incorporated by the other said lever to act as bearing for said pin, the opening of said hook facing away from said curved wall to permit said levers to be taken apart at will.